United States Patent [19]
Shimogama et al.

[11] Patent Number: 5,751,918
[45] Date of Patent: May 12, 1998

[54] SAFETY CIRCUIT FOR TEACHING OPERATION OF ROBOT

[75] Inventors: Shigeru Shimogama, Kawanishi; Hiroshi Nakajima, Itami; Kazunori Matsumoto, Ibaraki, all of Japan

[73] Assignee: Matsushita Electric Industrial Co., Ltd., Osaka, Japan

[21] Appl. No.: 804,264

[22] Filed: Feb. 21, 1997

[30] Foreign Application Priority Data

Feb. 29, 1996 [JP] Japan ................. 8-042568

[51] Int. Cl.⁶ .................. G05B 15/00; G05B 19/00
[52] U.S. Cl. .................. 395/99; 318/563; 318/568.11; 318/568.13; 318/568.24
[58] Field of Search ............. 395/99; 318/563, 318/568.11, 568.13, 568.24

[56] References Cited

U.S. PATENT DOCUMENTS

| | | | |
|---|---|---|---|
| 4,442,387 | 4/1984 | Lindbom | 318/568.13 |
| 4,697,979 | 10/1987 | Nakashima et al. | 414/786 |
| 5,212,433 | 5/1993 | Yasuyuki | 318/568.13 |
| 5,444,342 | 8/1995 | Matsuo et al. | 318/563 |

FOREIGN PATENT DOCUMENTS 61-153244  9/1986  Japan ............. H01H 13/70

*Primary Examiner*—Robert W. Downs
*Assistant Examiner*—Jason W. Rhodes
*Attorney, Agent, or Firm*—Watson Cole Stevens Davis, P.L.L.C.

[57] ABSTRACT

A robot includes a robot body to which the procedure of a task is teachable, a teaching portion, an operating portion, a control portion, and a changeover portion. The teaching portion includes a signal generating portion for generating a drive signal for driving the robot body, and a deadman switch which indicates by its opened/closed state whether the procedure of the task is being taught to the robot body or not. The operating portion generates a start signal for starting the robot body. The control portion receives the drive signal and a signal indicating the opened/closed state of the deadman from the teaching portion and the start signal from the operating portion. The changeover portion operates so that the start signal from the operating portion is prevented from being supplied to the control portion when the teaching portion is electrically connected to the control portion.

8 Claims, 3 Drawing Sheets

1 ...... ROBOT CONTROLLER
2 ...... TEACH PENDANT
3 ...... ROBOT BODY
6 ...... EXTERNAL CONTROL PANEL
7 ...... FRONT PANEL

SAFETY CIRCUIT FOR TEACHING OPERATION OF ROBOT

BACKGROUND OF THE INVENTION

1. Field of the Invention

The present invention relates to a playback type teaching robot, and particularly to a teach pendant (portable operating panel) of the robot and a controller thereof.

2. Description of the Related Art

A teach pendant (portable operating panel) is widely used for a playback type industrial teaching robot. This is because the teach pendant is useful to teach the procedure of a task by moving the industrial robot finely while directly watching a control point (end effector) of the robot. In most cases, the teach pendant is configured so as to be able to be gripped by one hand.

A deadman switch is mounted on the robot teach pendant in order to secure the safety of an operator. The deadman switch is electrically connected in series to an emergency stop circuit while the operator is teaching the procedure of a task to the industrial robot (that is, while the operator is operating the industrial robot by using the teach pendant). The deadman switch has a function of shutting off a servo electric source for driving a motor of the industrial robot and an electric source for unlocking a shaft (releasing a brake) of the motor, simultaneously in terms of circuitry when the operator releases the deadman switch.

The deadman switch is parallelly connected to a servo turning-on pushbutton switch on a robot controller side front panel or to a servo turning-on request signal circuit from an external control panel, or the like. Both of the servo turning-on pushbutton switch and the servo turning-on request signal circuit function as a circuit for making the motor driving servo electric source. A judgment is made by a software program as to which is the valid servo turning-on circuit, the former or the latter.

In a safety circuit of a conventional robot, a teach pendant (TP) validation switch 10, which is an alternate switch, is mounted on a teach pendant portion 2 as shown in FIG. 1. The teach pendant validation switch 10 is switched by a central processing unit (CPU) not shown, that is, by a software program so that the servo turning-on right is given to the teach pendant portion 2 side when the teach pendant validation switch 10 is closed whereas the servo turning-on right is given to a panel/external servo turning-on switch 17 side when the teach pendant validation switch 10 is opened.

Because a CPU teach-disabled signal 15 is made low logically in a not-shown flip-flop circuit by the CPU (software) when the teach pendant validation switch 10 is closed, a relay 16 is not excited so that a contact 16a is opened whereas a contact 16b is closed. As a result, a signal line 11a for connecting the contact 16b to a servo turning-on/shutting-off deadman switch 11 provided in the teach pendant portion 2 is grounded, so that a signal line 11b for connecting the deadman switch 11 to a group of photo-couplers 20 is grounded when the deadman switch 11 is opened. Accordingly, the CPU (software) can recognize the opened/closed state of the deadman switch 11 through the group of photo-couplers 20.

When both the teach pendant validation switch 10 and the deadman switch 11 are closed, a CPU servo electric source ON output signal 13 is made high logically in a not-shown flip-flop circuit by the CPU (software). As a result, if there is not any factor to prevent turning-on of servo electric supply to a robot body, for example, existence of an input signal such as a door stop signal, an external emergency stop signal, or the like, the relay 14 is excited so that the contact 14a is closed because the deadman switch 11 is closed. Accordingly, a DC voltage of 24 V is generated on a servo-enable signal line 12 so that a servo electric source turning-on circuit (not shown) is driven.

As described above, in the conventional safety circuit, the CPU (software) changes over the servo turning-on right as to where the servo turning-on right is located, on the teach pendant portion 2 side or on the panel/external servo turning-on switch 17 side. Accordingly, the CPU (software) can always recognize the respective switch input signals of the deadman switch 11, the panel/external servo turning-on switch 17, the panel start switch 18 and the external start switch 19, no matter where the servo electric source turning-on right exists on the teach pendant portion 2 side or on the panel/external servo turning-on switch 17 side.

In the conventional robot, however, the state in which the servo electric source of the robot is turned on/off by the operation of the deadman switch 11 provided in the teach pendant portion 2 and the state in which the servo electric source is turned on/off by the servo turning-on pushbutton switch (or external control panel input terminal portion) provided in the front panel of the robot controller are changed over by the CPU (software), so that there is a possibility that the deadman switch 11 cannot fulfil its function when a failure occurs in the CPU (software) even if the servo turning-on right exists on the teach pendant portion 2 side.

SUMMARY OF THE INVENTION

An object of the present invention is to provide a robot in which the safety of an operator performing a teaching operation by using a teach pendant is made more reliable particularly in response to the remarkable rise in safety consciousness as seen in standardization of safety devices in Europe in recent years.

According to an aspect of the present invention, a robot comprises: a robot body capable of being taught procedure of a task; a teaching portion including a signal generating portion for generating a drive signal for driving the robot body, and a deadman switch capable of making indication by its opened/closed state as to whether the procedure of the task is being taught to the robot body or not; an operating portion for generating a start signal for starting the robot body; a control portion supplied with the drive signal and a signal indicating the opened/closed state of the deadman switch from the teaching portion, and the start signal from the operating portion; and a changeover portion which operates so as to prevent the start signal of the operating portion from being supplied to the control portion when the teaching portion is electrically connected to the control portion.

According to another aspect of the present invention, a robot comprises: a robot body capable of being taught procedure of a task; a first switch capable of making indication by its opened/closed state as to whether the procedure of the task is teachable to the robot body or not; a second switch capable of making indication by its opened/closed state as to whether the procedure of the task is being taught to the robot body or not; an operating portion for generating a signal for starting the robot body; a control portion supplied with a signal indicating the opened/closed state of the first switch and a signal indicating the opened/closed state of the second switch; a first changeover mechanism provided between the second switch and the control portion so that the signal indicating the opened/closed state of the second switch is supplied to the control portion only when the signal indicating the opened/closed state of the first switch indicates that the procedure of the task is teachable to the robot body; and a second changeover mechanism provided between the operating portion and the control portion so that the signal for starting the robot body is prevented from being supplied to the control portion when the signal indicating the opened/closed state of the first switch indicates that the procedure of the task is teachable to the robot body.

DESCRIPTION OF THE PREFERRED EMBODIMENTS

Figure 3:
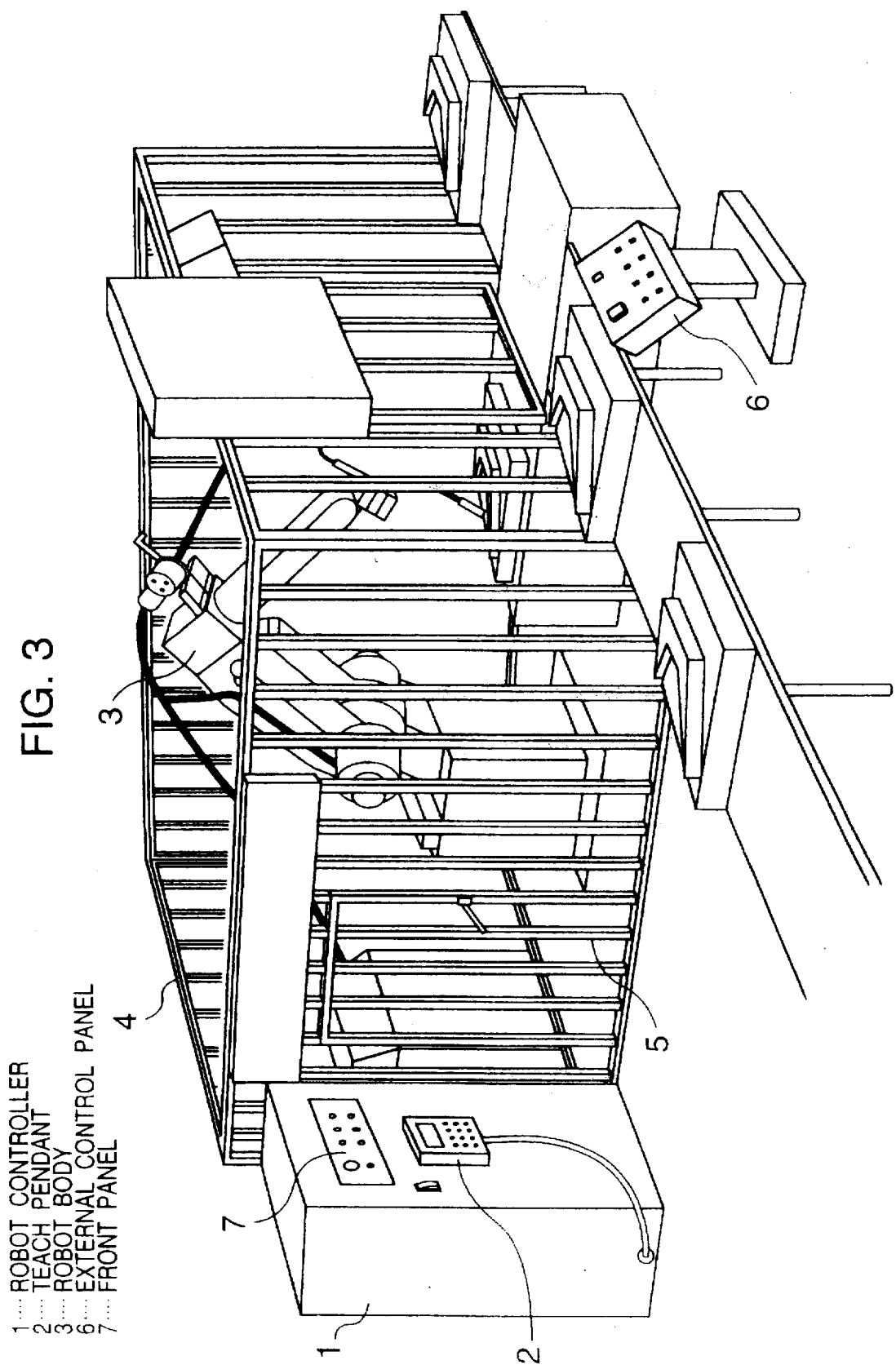
FIG. 3 is a view showing a system layout of a robot according to an embodiment of the present invention.

In a robot according to an embodiment of the present invention, as shown in FIG. 3, a robot body 3 is disposed inside a safety fence 4, and a robot controller 1, an external control panel 6, etc. are disposed outside the safety fence 4. A door 5 is provided in the safety fence 4. When an operator is to teach the procedure of a task to the robot, the operator opens the door 5 and enters into the safety fence 4 while holding in hand a teach pendant portion 2 provided in the robot controller 1.

In the case of a playback type teaching robot, the operator continuously pushes a deadman switch 11 (see FIG. 2) provided in the teach pendant portion 2 so as to turn a servo electric source for driving the robot body 3 into an ON-state, and, at the same time, pushes move key-switches of respective axes provided in the teach pendant portion 2 so as to move the robot body 3 sequentially in accordance with the procedure of the task to be subjected to an end effect to thereby teach respective positions and teach input/output instructions, or the like, required at the respective teaching points.

In a front panel 7 of the robot controller 1, there are provided a pushbutton switch for requesting turning-on of servo electric supply for driving a motor of the robot body 3, a switch for operating the start of the running of the robot body 3, and so on.

The external control panel 6 is provided for performing not only the ON/OFF operation of the supply of a primary electric source to a robot system, but also the selection of the turning-on of a servo electric source to the robot body 3 and the operation mode of the robot body 3, the selection of a taught program, the operation of starting the running of the selected program, and so on.

Figure 1:
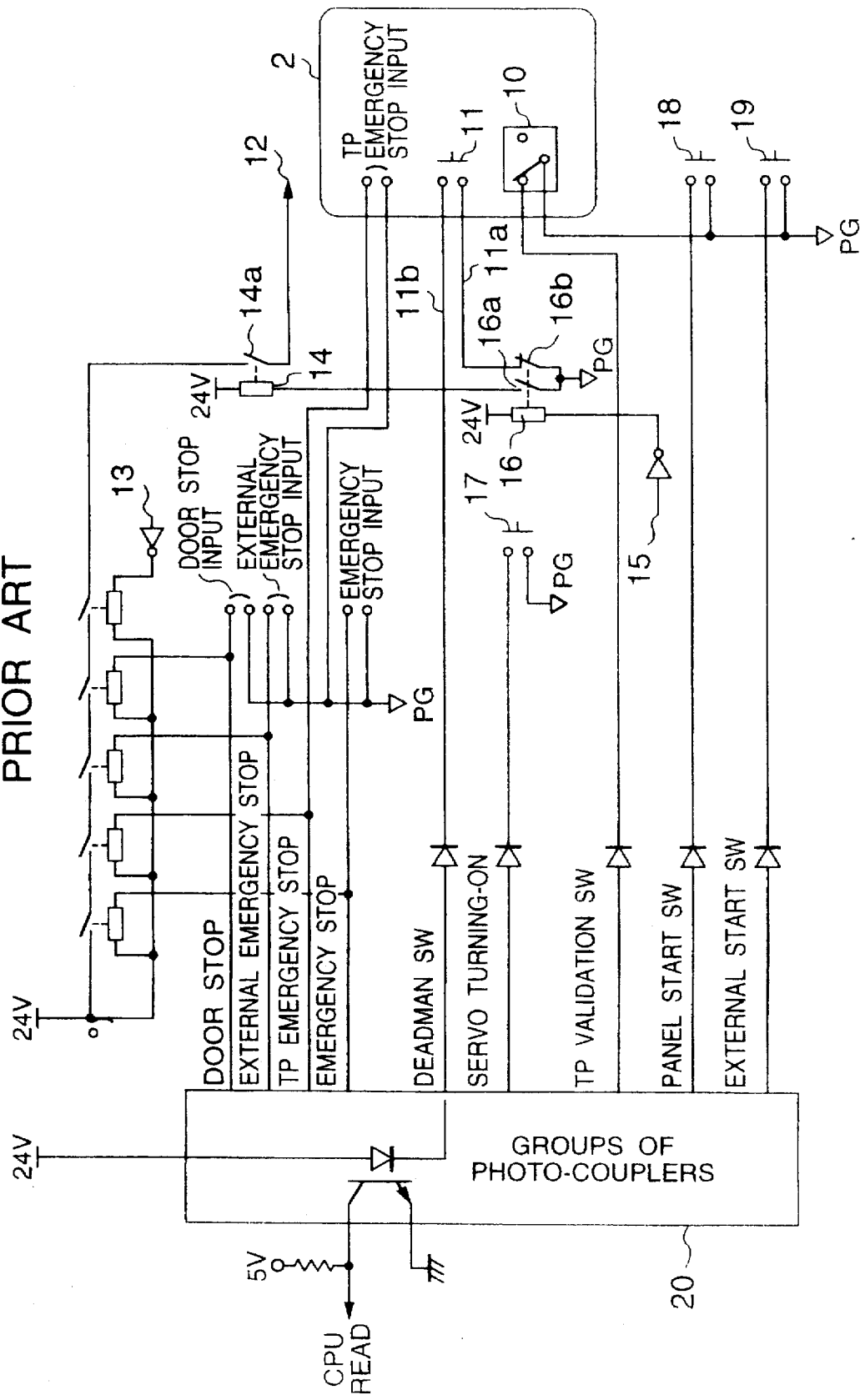
FIG. 1 is a circuit diagram showing a safety circuit in a conventional robot.
Figure 2:
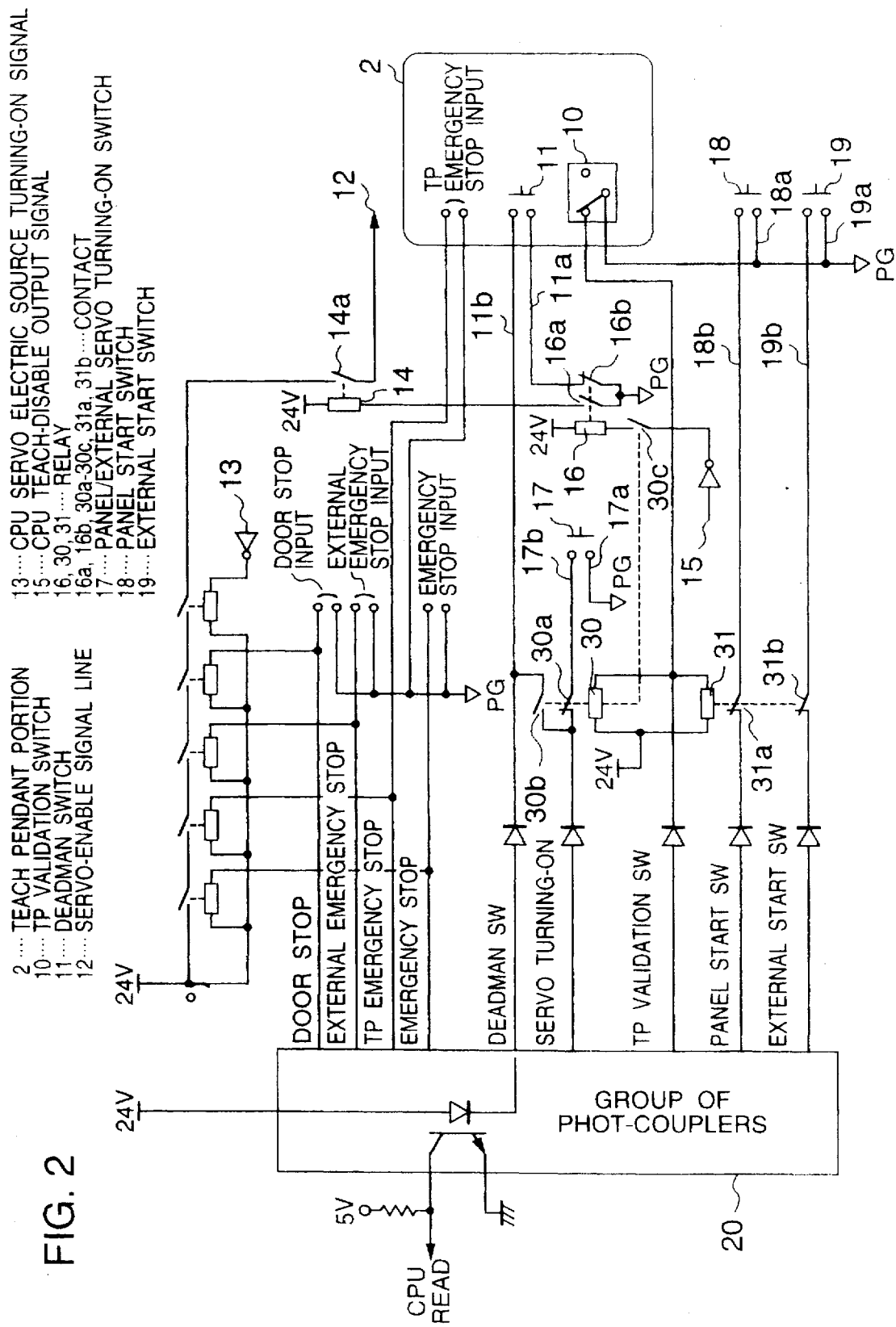
FIG. 2 is a circuit diagram showing a safety circuit in a robot according to an embodiment of the present invention.

The safety circuit of the robot according to the embodiment of the present invention is different from the safety circuit shown in FIG. 1 in the following points, as shown in FIG. 2.

(1) The safety circuit contains a relay 30 which has a contact 30a provided in a signal line 17b which connects the panel/external servo turning-on switch 17 and the group of photo-couplers 20, a contact 30b provided between the signal line 17b and a signal line 11b which connects the deadman switch 11 and the group of photo-couplers 20, and a contact 30c provided in the input side of the CPU teach-disable output signal 15 of the relay 16, the relay 30 being controlled by the teach pendant (TP) validation switch 10.

(2) The safety circuit contains a relay 31 which has a contact 31a provided in a signal line 18b which connects the panel start switch 18 and the group of photo-couplers 20, and a contact 31b provided in a signal line 19b which connects the external start switch 19 and the group of photo-couplers 20, the relay 31 being controlled by the teach pendant validation switch 10.

The operation of the safety circuit shown in FIG. 2 will be described below upon the assumption that the servo electric source turning-on right for driving the robot body 3 is located in the teach pendant portion 2 side for the sake of convenience.

When the teach pendant validation switch 10 is closed, the relay 30 is excited so that the contact 30c is opened. As a result, the relay 16 is not excited and the contact 16b is closed so that the contact 16b-side terminal of the deadman switch 11 is grounded. Further, the relay 30 is excited so that the contact 30a is opened whereas the contact 30b is closed. As a result, the deadman switch 11 is connected to the group of photo-couplers 20, so that the opened/closed state of the deadman switch 11 can be recognized by the CPU (software).

On the other hand, the panel/external servo turning-on switch 17 is not connected to the group of photo-couplers 20 because the contact 30a is opened. As a result, even if any person other than the operator makes a servo electric source turning-on request to the CPU (software) from the front panel 7 of the robot controller 1 through the panel/external servo turning-on switch 17, the CPU (software) cannot recognize the servo electric source turning-on request.

When the teach pendant validation switch 10 is closed, the relay 30 is excited so that the contact 30c is opened. Further, in order to turn-on the servo electric source for driving the robot, it is necessary that a DC voltage is generated on the servo-enable signal line 12. In this safety circuit, when the operator closes the deadman switch 11, the relay 14 is excited to close the contact 14a, and, at the same time, the CPU (software) recognizes the closing of the deadman switch 11 through the group of photo-couplers 20 and makes the level of the CPU servo electric source turning-on signal 13 high logically in a not-shown flip-flop circuit. As a result, hardware and software are matched with each other so that a DC voltage of 24 V is generated on the servo-enable signal line 12 to enable the servo electric source to be turned on.

Further, when the teach pendant validation switch 10 is closed, the relay 31 is excited so that the contacts 31a and 31b are opened. As a result, the panel start switch 18 and the external start switch 19 for requesting the start of the operation of the robot are not connected to the group of photo-couplers 20, so that, even if any person other than the operator tries to supply a start signal to the CPU (software) through the panel start switch 18 or the external start switch 19, the CPU (software) can not recognize the start signal.

That is, the safety circuit of the robot in this embodiment has a configuration in which not only the location of the servo electric source turning-on right to a motor for driving the robot body 3 is changed over between the teach pendant portion 2 side and the robot controller 1 side by means of hardware, but also the change-over is performed exclusively so that the CPU (software) cannot recognize the signal for starting the operation of the robot when the teach pendant operation is enabled (validated).

As is apparent from the above description, in the safety circuit of the robot in this embodiment, the servo electric source turning-on right for the robot is changed over to the teach pendant portion 2 side or to the robot controller 1 (or external control panel 6) side by operating at least one relay through the teach pendant validation switch 10 provided as an operation-enabling switch in the teach pendant portion 2. Further, in the case where the servo electric source turning-on right is located on the teach pendant portion 2 side, only the operator who is holding the teach pendant portion 2 can turn on the servo electric source only when hardware and software are matched with each other, and no one can turn on the servo electric source by any means other than the deadman switch 11 provided in the teach pendant portion 2.

Accordingly, in the safety circuit of the robot in this embodiment, the safety of the operator who performs teaching of the robot can be made more secure compared with the conventional safety circuit.

In the robot according to the present invention, because the start signal from the operating portion is not supplied to the robot body in the state where the teaching portion is electrically connected to the robot body, the robot body is never started by the operation of the operating portion while teaching is being performed in the teaching portion. Further, because the judgment as to whether the teaching portion is electrically connected to the robot body or not is made on the basis of the state of connection/disconnection by means of hardware between the control portion and the operating portion, the safety of the operator can be made secure even in the case where a failure occurs in the control portion. Accordingly, safety can be made more reliable.

That is, where the right of turning-on a signal for driving or starting the robot body is to be given, the teaching portion side or the operating portion side, is changed over by means of hardware. In the case where the right of inputting the signal for driving the robot body is given to the teaching portion side, the robot body cannot be driven unless there is matching between software for recognizing a signal from the teaching portion and the aforementioned hardware, and the operations of portions other than the teaching portion are shut off from software by means of hardware. Accordingly, the safety of the operator who performs a teaching operation can be made more reliable.

What is claimed is:

1. A robot comprising:

a robot body capable of being taught procedure of a task;

a teaching portion including a deadman switch for operation by an operator to make indication by its opened/closed state as to whether or not said procedure is being taught to said robot body, and a teaching portion validation switch for making indication by its opened/closed state as to whether or not said deadman switch has a valid servo turning-on right;

an external servo turning-on switch for making indication by its opened/closed state as to whether or not an external servo turning-on request is made;

a control portion supplied with a first signal from said teaching portion, said first signal indicating the opened/closed state of said deadman switch, a second signal from said teaching portion, said second signal indicating the opened/closed state of said teaching portion validation switch, and an external servo turning-on request signal from said external servo turning-on switch, said external servo turning-on request signal indicating the opened/closed state of said external servo turning-on switch; and a changeover portion for preventing said external servo turning-on request signal from being supplied to said control portion when said second signal indicates that said deadman switch has said valid servo turning-on right.

2. A robot according to claim 1, wherein said changeover portion includes a first changeover mechanism provided between said teaching portion and said control portion, a second changeover mechanism provided between said external servo turning-on switch and said control portion, and a first control mechanism for opening said second changeover mechanism when said first changeover mechanism is closed.

3. A robot according to claim 2, wherein said first and second changeover mechanisms and said first control mechanism are constituted by a relay.

4. A robot according to claim 2, further comprising:

a third changeover mechanism provided between said robot body and said control portion; and a second control mechanism for closing said third changeover mechanism when said deadman switch is closed after said first changeover mechanism is closed.

5. A robot according to claim 4, wherein said first and second changeover mechanisms and said first control mechanism are constituted by a first relay; and said third changeover mechanism and said second control mechanism are constituted by a second relay.

6. A robot according to claim 1, wherein said opened/closed state of said teaching portion validation switch is controlled by a CPU of said control portion.

7. A robot comprising:

a robot body capable of being taught procedure of a task;

a first switch for making indication by its opened/closed state as to whether or not said procedure is teachable to said robot body;

a second switch for making indication by its opened/closed state as to whether or not said first switch has a valid servo turning-on right;

a third switch for making indication by its opened/closed state as to whether or not an external servo tuning-on request is made;

a control portion supplied with a first signal indicating the opened/closed state of said first switch, a second signal indicating the opened/closed state of said second switch, and a third signal indicating the opened/closed state of said third switch; and a first changeover mechanism provided between said first switch and said control portion so that said first signal is supplied to said control portion only when said second signal indicates that said first switch has said valid servo turning-on right; and a second changeover mechanism provided between said third switch and said control portion so that said third signal is prevented from being supplied to said control portion when said second signal indicates that said first switch has said valid servo turning-on right.

8. A robot according to claim 7, wherein said opened/closed state of said second switch is controlled by a CPU of said control portion.

* * * * *